Nov. 17, 1970     F. J. NOLA     3,541,361

BRUSHLESS DIRECT CURRENT TACHOMETER

Filed Aug. 28, 1969     2 Sheets-Sheet 1

INVENTOR
FRANK J. NOLA

BY

ATTORNEYS

Nov. 17, 1970   F. J. NOLA   3,541,361
BRUSHLESS DIRECT CURRENT TACHOMETER
Filed Aug. 28, 1969   2 Sheets-Sheet 2

INVENTOR
FRANK J. NOLA
BY
ATTORNEYS

United States Patent Office 3,541,361
Patented Nov. 17, 1970

3,541,361
BRUSHLESS DIRECT CURRENT TACHOMETER
Frank J. Nola, Huntsville, Ala., assignor to the United States of America as represented by the Administrator of the National Aeronautics and Space Administration
Filed Aug. 28, 1969, Ser. No. 853,716
Int. Cl. H02k
U.S. Cl. 310—10                                                                      5 Claims

ABSTRACT OF THE DISCLOSURE

A DC tachometer is disclosed utilizing Hall effect crystals to achieve brushless commutation. A crystal is placed at the center of a pole defined by each of the armature windings of an alternator having a permanent magnet rotor. The Hall effect crystals are positioned to be responsive along a first axis to the flux generated by the permanent magnet and have a second axis perpendicular to the first axis electrically connected to the armature windings so as to be responsive to the current induced in the armature winding upon rotation of the rotor. The output voltages of the Hall effect crystals appearing on the axis perpendicular to the first and second axes are summed to obtain a voltage proportional to the speed of the rotor that is independent of rotor position.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The present invention relates to tachometers and more particularly to a DC tachometer which supplies an output voltage having a magnitude proportional to shaft speed.

A conventional DC tachometer makes use of a commutator and brush assembly for rectifying an AC signal generated in the rotating armature winding. The commutator and brush assembly thus can be considered as a mechanical rectifier in addition to serving as a means for electrically connecting wires to the rotating armature. A DC output proportional to shaft speed also can be obtained by rectifying the output of various types of conventional AC tachometers. The disadvantages of the DC tachometer are found in the mechanical switching arrangement (such as commutator and brushes). Some of these disadvantages are high friction torque, ripple voltage in the output signal, curtailed life due to wear, and decreased reliability. The disadvantages associated with the rectification of the outputs of AC tachometers are poor linearity, displacement error at zero speed, and the fact that additional circuitry is required.

SUMMARY OF THE INVENTION

In accordance with the present invention, the foregoing disadvantages are overcome by using Hall crystals to achieve brushless commutation. A plurality of Hall crystals are utilized and are positioned so as to be responsive to the respective current changes in armature windings excited by a permanent magnet rotor and also to be responsive to the magnetic field produced by the rotor. The current generated in each of the armature windings is proportional to the speed of rotation of the rotor and in turn causes the output voltage of the Hall crystals to vary proportionally to the speed of rotation of the rotor. Additionally the Hall crystals are aligned at the center of the pole defined by their respective armature windings so that the magnetic field exciting the Hall crystals is in phase with the current applied thereto. The output voltage of the crystals are added to achieve an output voltage that is independent of the position of the permanent magnet rotor.

Accordingly, it is an object of the present invention to provide improved tachometers for producing an electrical output that is a linear function of the speed of a rotating shaft.

It is another object of this invention to provide a direct current signal proportional to the speed of a shaft without the use of brushes and commutators.

Still another object of the invention is to provide a tachometer having zero displacement error at zero speed.

BRIEF DESCRIPTION OF THE DRAWINGS

Other objects and advantages of the present invention will be specifically pointed out or otherwise become apparent when referring, for a better understanding of the invention, to the following description taken in conjunction with the accompanying drawings, wherein.

DESCRIPTION OF THE PREFERRED EMBODIMENT

Figure 1:
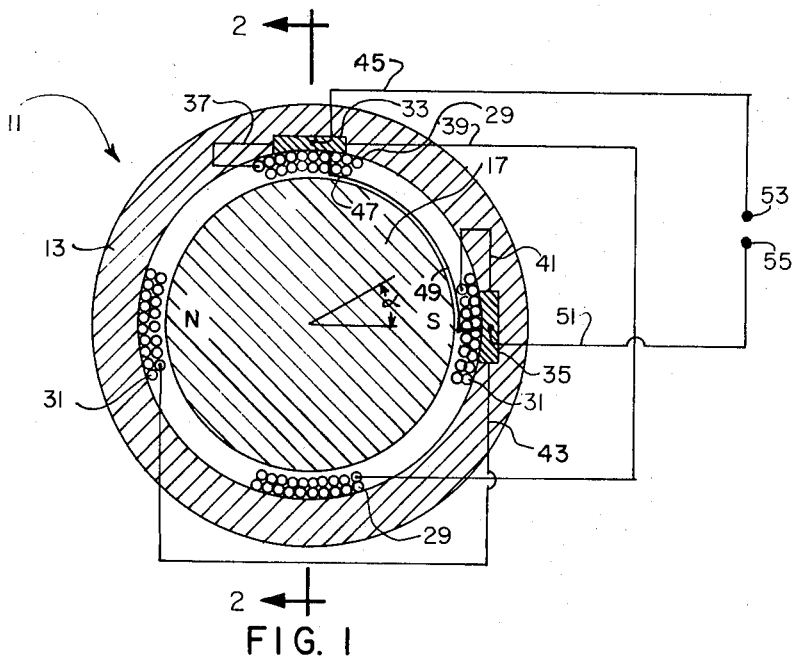
FIG. 1 is a sectional view of a tachometer embodying features of the present invention.
Figure 2:
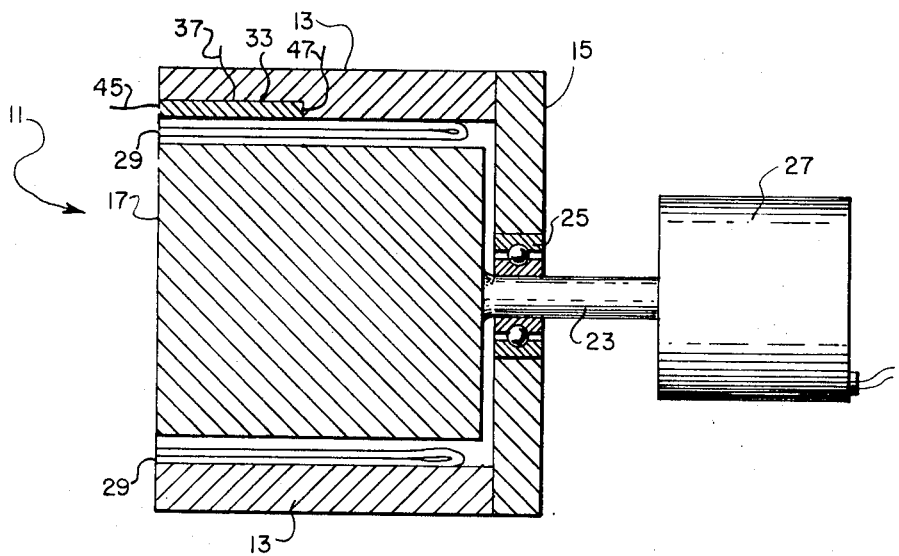
FIG. 2 is a sectional view of the tachometer of FIG. 1 taken along the line 2—2 of FIG. 1.

Referring now to FIGS. 1 and 2 of the drawing one form of the tachometer, embodied in a two pole, two phase alternator and indicated generally by reference numeral 11, includes a yoke 13 and an end plate 15 secured to the yoke 13 by any suitable means known to the art. A permanent magnet rotor (having a north and a south pole) is carried by a shaft 23 the shaft being rotatably supported in the end plate 15 by a bearing 25. A suitable driving source such for example as a motor 27, whose speed is to be measured, is connected to the shaft 23.

Conventionally wound armature windings 29 and 31 are carried by the yoke 13 and are displaced from one another by 90 electrical degrees. When motor 27 is energized to drive shaft 23, permanent magnet rotor 17 rotates and induces a voltage in armature windings 29 and 31. It will be appreciated that the yoke 13 is formed from a magnetic material which provides a return path for the flux emanating from the north pole of permanent magnet rotor 17.

First and second Hall effect crystals 33 and 35 are mounted on the yoke 13 at the center respectively of a pole defined by windings 29 and a pole defined by winding 31 and in positions at which the flux of the permanent magnet 17 passes through each crystal. The crystals 33 and 35 accordingly are displaced from one another 90 electrical degrees. Each of the crystals 33 and 35 may be formed of any suitable semiconductor material known to the art and have respectively a pair of current leads 37 and 39 and 41 and 43 adapted to pass current through the crystal in the direction of one axis and respectively a pair of output conductors 45 and 47 and 49 and 51 connected to the crystal at points adjacent to the ends of an axis of the crystal which is perpendicular to the current axis of the crystal.

Figure 3:
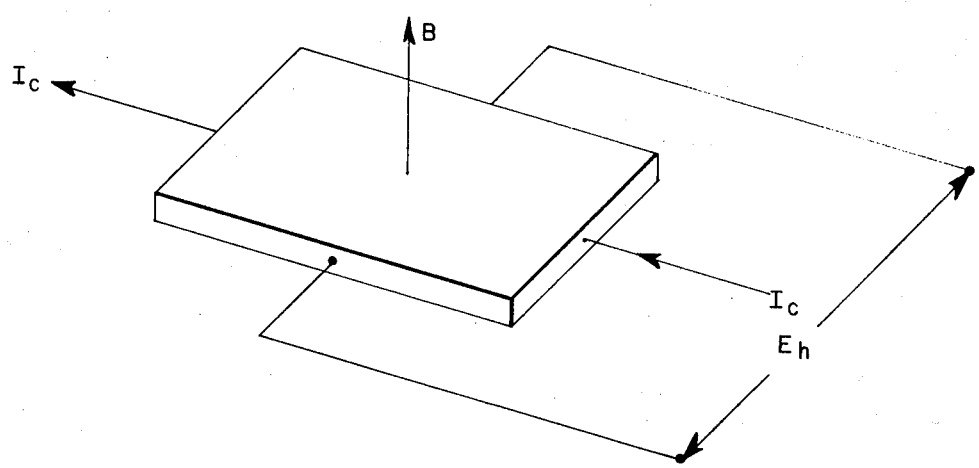
FIG. 3 is a schematic view of a Hall generator of FIGS. 1 and 2 and the electrical connections thereto.

This may be more clearly seen by reference to FIG. 3, a schematic of the Hall effect crystal 33 of FIGS. 1 and 2 and the electrical connections thereto. As shown the output voltage $E_h$ from the Hall effect crystal is taken from one orthogonal axis lying in the plane of the crystal while the exciting current $I_c$ is applied across the other orthogonal axis lying in the plane of the crystal. The flux B from the permanent magnet rotor 17 penetrates the crystal perpendicular to the plane thereof.

As is well known in the art, if a current passes through a Hall crystal in the direction of one axis while a magnetic flux passes through a crystal in the direction of an axis perpendicular to the first axis, then the crystal produces an output voltage in the direction of a third axis perpendicular to the first two axis. As is further known in the art, the magnitude of this output voltage is directly proportional to the strength of the magnetic field and to the strength of the current.

Referring again to FIGS. 1 and 2 current leads 37 and 39 of Hall crystal 33 are connected to the output of armature winding 29 while current leads 41 and 43 of Hall crystal 35 are connected to the output of armature winding 31. The output leads 47 and 49 of the respective crystals are connected together and output leads 45 and 51 are respectively connected to output terminals 53 and 55 so as to sum the outputs of the crystals.

As has been explained hereinabove and as is known in the art, when the permanent magnet rotor 17 rotates voltages are induced in armature windings 29 and 31 that are proportional to the speed of rotation of the rotor. The magnitude of this voltage induced in windings 29 and 31 may be expressed as, $$V_{29} = K_w \omega \sin \alpha \qquad (1)$$

$$V_{31} = K'_w \omega \cos \alpha \qquad (2)$$

where $K_w$ and $K'_w$ are the winding constants having dimensions of volts per radian per second and which are proportional to the number of turns of wire, the length of the magnetic field cutting the turns, the radius of the magnet and the magnetic field strength produced by the permanent magnet rotor, where $\omega$ is the speed of the rotor in radians per second and where $\alpha$ is the angular position of the rotor.

The output voltages of Hall crystals 33 and 35 are $$V_{33} = K_h I_c B \sin \alpha \qquad (3)$$

$$V_{35} = K'_h I'_c B \cos \alpha \qquad (4)$$

where $K_h$ and $K'_h$ are the respective Hall constants with dimension of volts per ampere kilogauss, $I_c$ and $I'_c$ are the currents applied to the respective crystals and B is the flux produced by the permanent magnet rotor.

If R represents the winding resistance of winding 29 and the input resistance of Hall crystal 33 then from Equation 1

$$I_c = \frac{K_w \omega}{R} \sin \alpha \qquad (5)$$

Similarly if R' represents the winding resistance of winding 31 and the input resistance of Hall crystal 35 then, $$I'_c = \frac{K'_w \omega}{R'} \cos \alpha \qquad (6)$$

Substituting Equation 5 in Equation 3 and Equation 6 in Equation 4, $$V_{33} = \frac{K_h K_w \omega B}{R} \sin^2 \alpha \qquad (7)$$

$$V_{35} = \frac{K'_h K'_w B}{R'} \cos^2 \alpha \qquad (8)$$

In operation, values of the Hall constants $K_h$ and $K'_h$ of the respective Hall crystals 33 and 35 are matched, the resistances R and R' are matched and the winding constants $K_w$ and $K'_w$ are matched, so that if the output voltages of Hall crystals 33 and 35 are summed $$V_{33} + V_{35} = V_o = \frac{K_h B K_w \omega}{R} (\sin^2 \alpha + \cos^2 \alpha) \qquad (9)$$

or $$V_o = \frac{K_h B K_w \omega}{R} \qquad (10)$$

All of the above are constants of the design, thus Equation 10 may written $$V_o = K_t \omega \qquad (11)$$

where $K_t$ is some gradient constant having dimensions of volts per radian per second. As shown in FIG. 1 the output voltages of crystals 33 and 35 are summed by connecting the crystal leads 47 and 49 together and connecting leads 45 and 51 respectively to output terminals 53 and 55. Alternately the output of each crystal could be connected to a summing amplifier.

In the operation of the present invention will be recognized that if the shaft 23 is motionless, no current will be induced in armature windings 29 and 31. Accordingly the output of each crystal 33 and 35 will be zero and the displacement error signal will be zero when the shaft 23 is not rotating.

Figure 4:
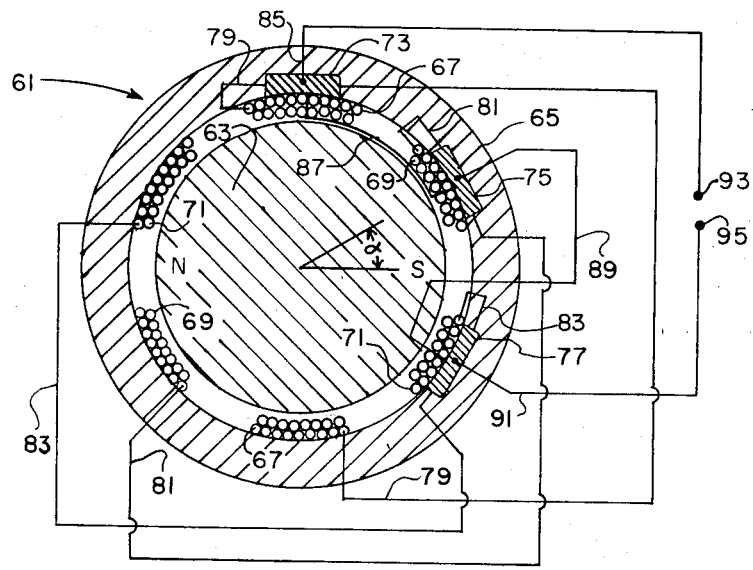
FIG. 4 is a sectional view illustrating another embodiment of the invention.

While the present invention has been described hereinbefore as embodied in a two pole, two phase alternator, it will be apparent to those skilled in the art that additional phases may be added to increase the gradient constant. Referring to FIG. 4, a construction similar to FIGS. 1 and 2 is shown comprising a two pole three phase alternator 61. A permanent magnet rotor 63 is mounted for rotation within yoke 65, rotor 63 and yoke 65 being of similar construction to rotor 17 and yoke 13 of FIGS. 1 and 2. Conventionally wound armature windings 67, 69 and 71 are carried by yoke 13 and are displaced from one another by 60 electrical degrees. First, second and third Hall effect crystals 73, 75 and 77 are mounted on the yoke 65 at the center respectively of the poles defined by windings 67, 69 and 71 in positions at which the flux generated by rotor 67 passes through each crystal. The output of the armature windings 67, 69 and 71 are respectively connected to excite crystals 73, 75 and 77 via leads 79, 81 and 83 to produce an output voltage at each Hall crystal that varies with the speed of rotor 63. The output voltages of the Hall crystals are added by connecting the output leads 85, 87, 89 and 91 of the Hall crystals in series between output terminals 93 and 95.

Assuming that the Hall constants of the Hall crystals 73, 75 and 77 are matched, the input resistances of crystals 73, 75 and 77 are matched and the winding constants of windings 67, 69 and 71 are matched then the output voltage appearing at output terminals 93 and 95 is $$V_o = [\sin^2 \alpha + \sin^2 (\alpha + 60°) + \sin^2 (\alpha + 120°)] K_t \omega \qquad (12)$$

or $$V_o = 1.5 K_t \omega \qquad (13)$$

Accordingly it may be seen that adding one phase increased the output of the tachometer by 50 percent. Additionally it will be seen that for N phases the output will be proportional to $N/2$.

While preferred embodiments of the invention have been shown and described in detail for illustration purposes, it is to be understood that the invention is not limited thereto. Various changes may also be made in the design and arrangement of the parts without departing from the spirit and scope of the invention as the same will now be understood by those skilled in the art.

What is claimed is:

1. A tachometer for measuring an input speed comprising:
    a permanent magnet rotor having magnetic poles of opposite polarity thereon for producing a magnetic flux field;
    housing means circumscribing said rotor providing a magnetic return path for said flux field;
    armature windings supported by said housing;
    means for rotating said rotor at said input speed to cause said field to induce currents in said armature windings;
    a plurality of Hall device crystals, at least one crystal associated with each armature winding;

means for passing the current induced in each of said armature windings through the crystal associated with said armature winding along a first axis of said crystal;

means positioning said crystals in magnetic flux field sensing relationship to said magnet poles, wherein said magnetic flux field passes through said crystals in the direction of a second axis substantially perpendicular to said first axis and wherein said magnetic flux field sensed by respective crystals is in phase with said current applied to said respective crystals;

said crystals further including voltage output leads on axes perpendicular to said first and second axis; and means for summing the voltages appearing on the output leads of said crystals.

2. The apparatus of claim 1 wherein said last named means comprises current conducting leads coupling said voltage output leads of said crystals in series.

3. The apparatus of claim 1 wherein the Hall constants of said Hall crystals are matched, the winding constants of said armature windings are matched, the resistances of said armature windings are matched and the inputs resistances of said Hall crystals are matched.

4. The apparatus of claim 1 in which each of said armature windings defines a plurality of poles, each of said poles equally spaced from one another.

5. The apparatus of claim 4 wherein said respective crystals are positioned at the center of a pole defined by each of said armature windings.

References Cited

UNITED STATES PATENTS 3,293,457   12/1966   Mori et al. _____ 310—10

DAVID X. SLINEY, Primary Examiner

U.S. Cl. X.R.

310—46